Nov. 16, 1965  W. F. WOLFNER ETAL  3,218,076
DICTATING MACHINE

Filed March 5, 1962  6 Sheets-Sheet 1

INVENTORS:
WILLIAM F. WOLFNER
JOHN G. WALLACE
BY RALPH H. SHERMAN JR.

Curtis, Morris & Safford
ATTORNEYS.

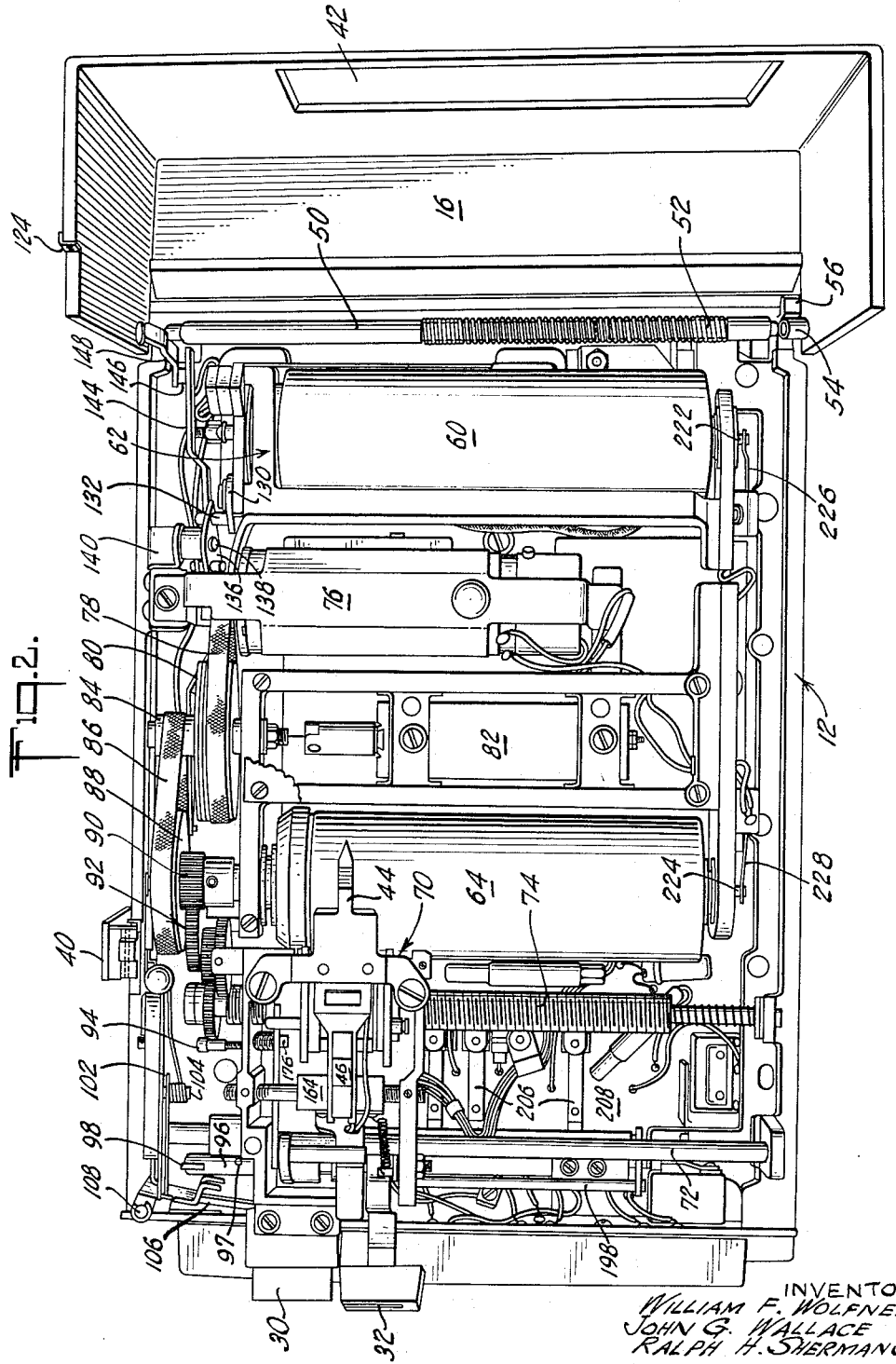

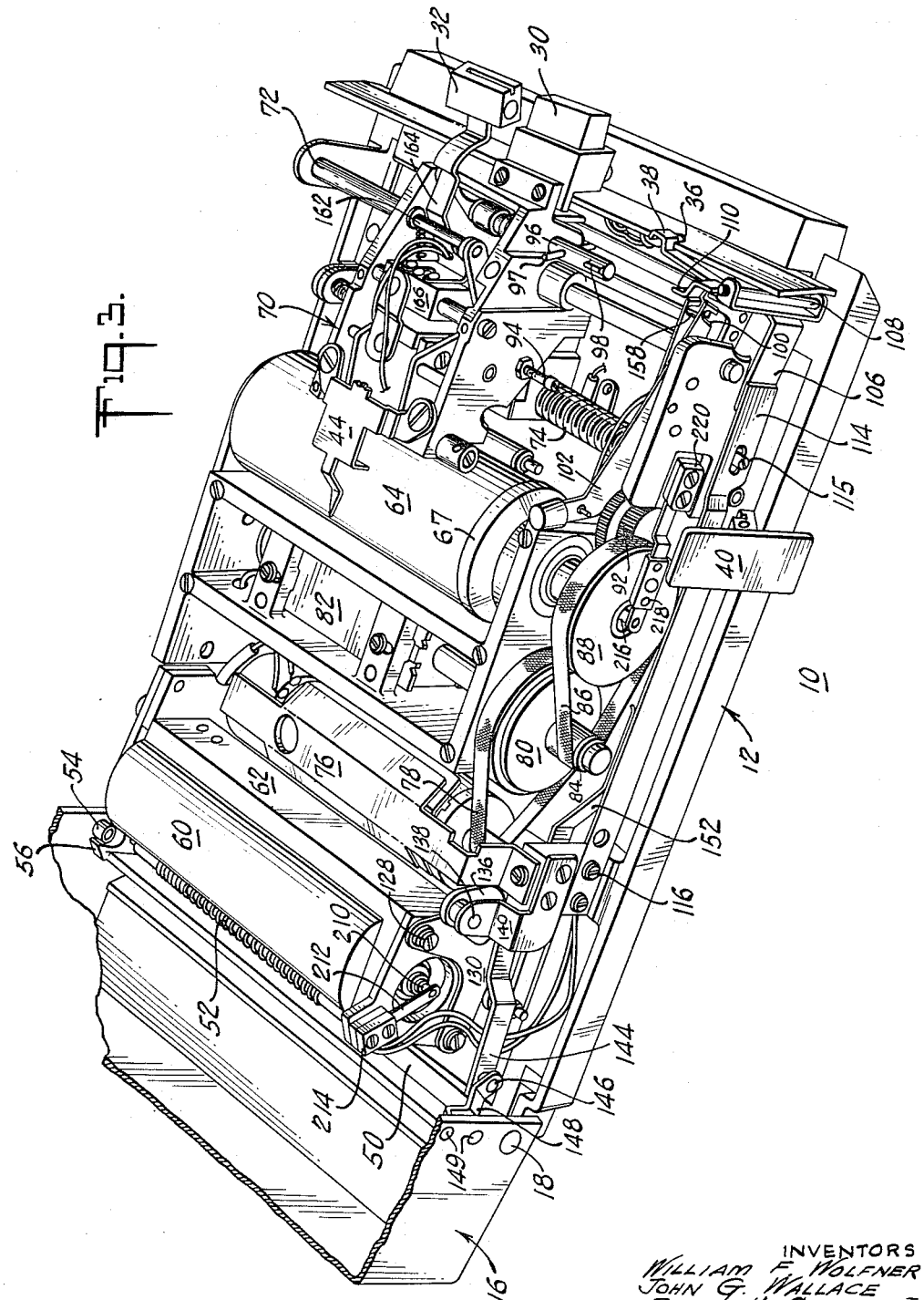

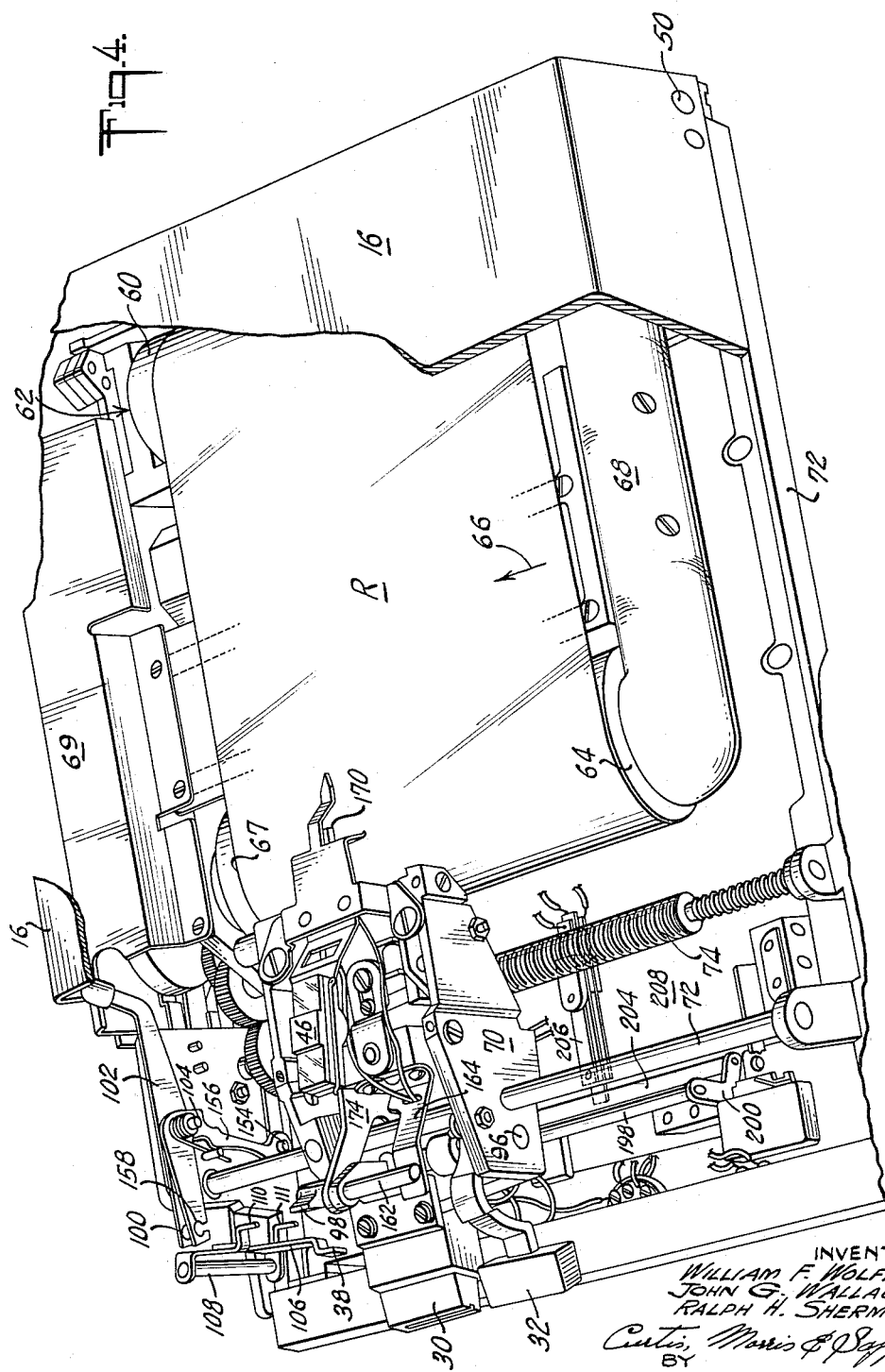

Nov. 16, 1965   W. F. WOLFNER ETAL   3,218,076
DICTATING MACHINE
Filed March 5, 1962   6 Sheets-Sheet 5
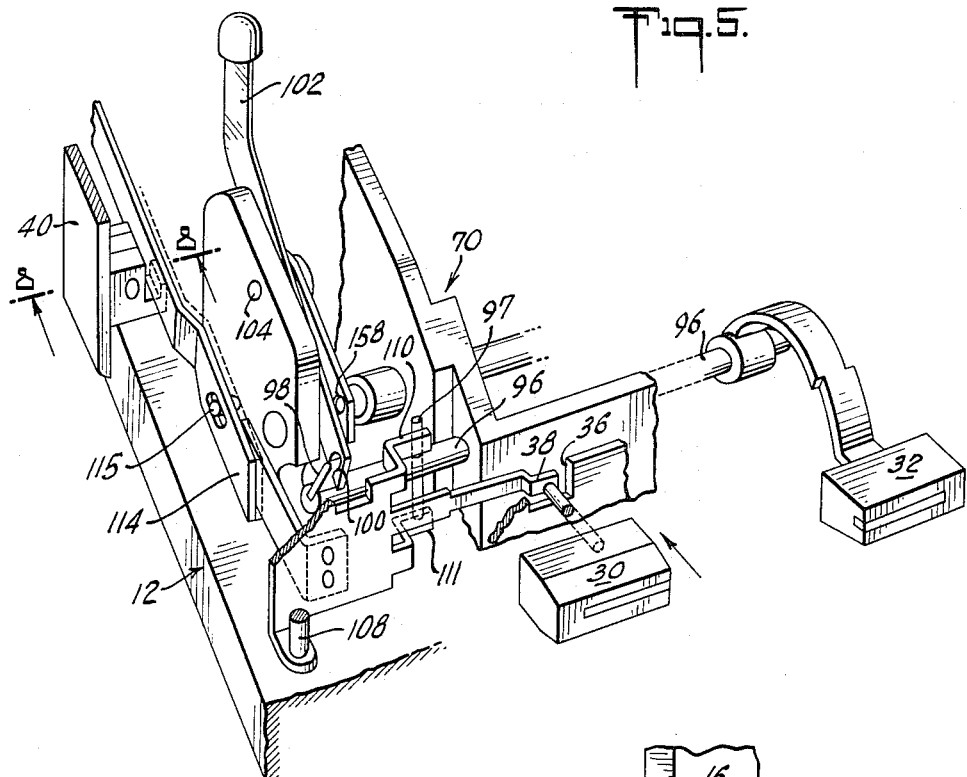
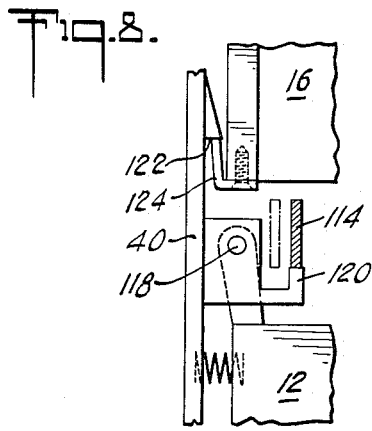
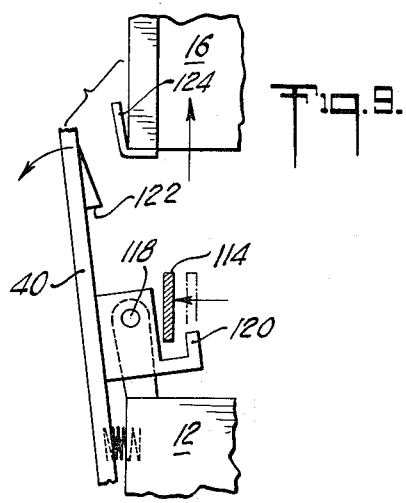
INVENTORS
WILLIAM F. WOLFNER
JOHN G. WALLACE
RALPH H. SHERMAN JR.
BY
ATTORNEYS

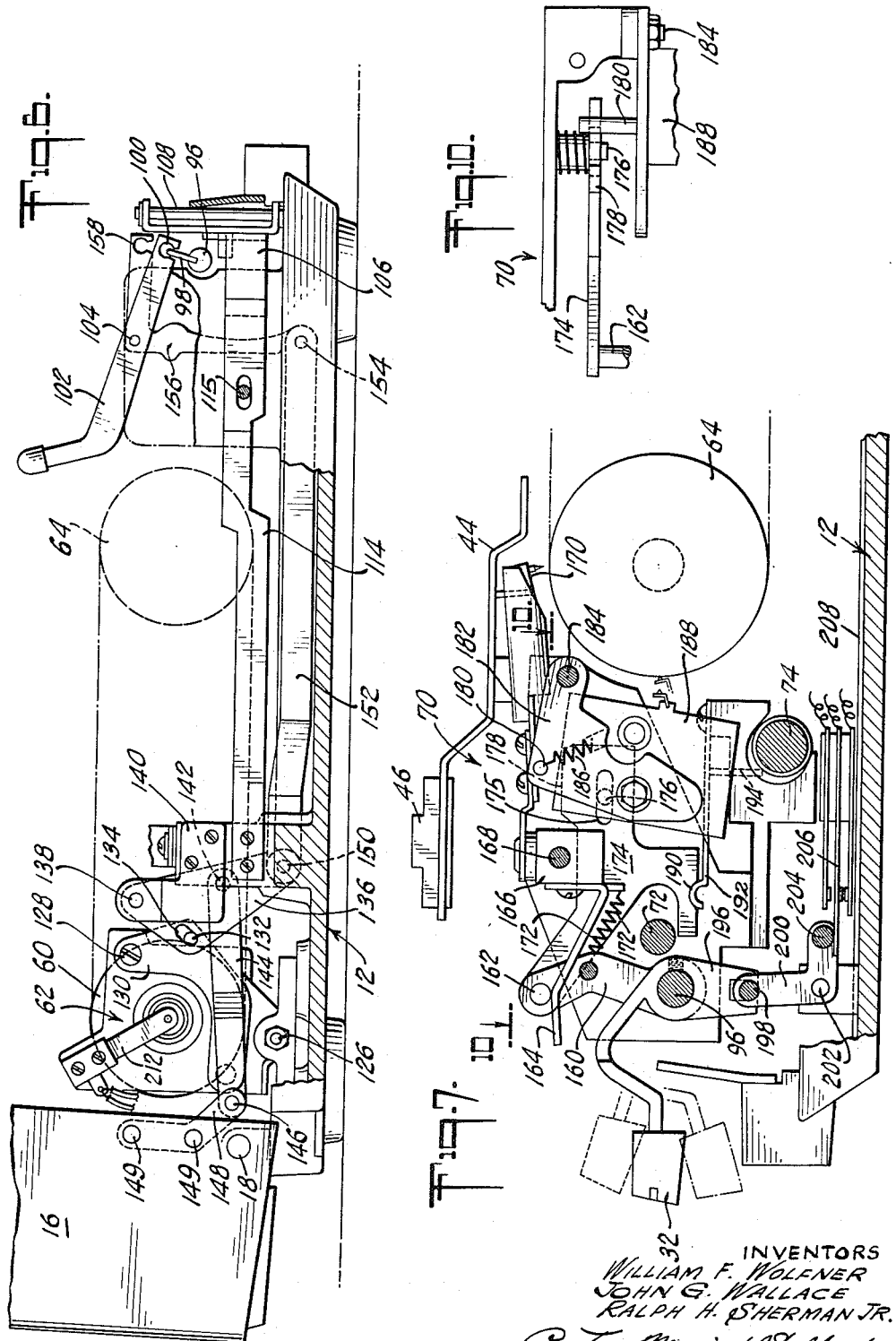

3,218,076
DICTATING MACHINE
William F. Wolfner, Milford, John G. Wallace, Branford, and Ralph H. Sherman, Jr., Fairfield, Conn., assignors to Dictaphone Corporation, Bridgeport, Conn., a corporation of Connecticut
Filed Mar. 5, 1962, Ser. No. 177,639
15 Claims. (Cl. 274—4)

This invention relates to a dictating machine, and more particularly to a self-powered, portable dictating machine which uses a belt record.

An object of the invention is to provide a very compact, highly portable dictating machine which uses a belt record of the same size and kind as that used with a full size, standard office dictating machine.

A more specific object is to provide in a portable machine of this kind operating controls and interlocks which insure that the machine will operate efficiently, that it can easily be loaded with a record, and that the machine is safeguarded against inadvertent attempts to operate it improperly.

A further object is to provide a machine of this kind which is rugged and dependable and which can be mass produced at reasonable cost.

These and other objects will in part be understood from and in part pointed out in the following description.

In U.S. application, Serial No. 728,646, now U.S. Patent No. 3,056,606, there is disclosed a dual mandrel belt record dictating machine. This machine uses a thin, wide plastic belt and records upon the record by forming in it a mechanical groove corresponding to a sound signal. The recording time obtainable with a belt record only 3½ inches wide and 12 inches in circumference is about 15 minutes. As is known, a machine using such a record avoids the shortcomings and inconvenience inherent with other types of records, such as discs, magnetic tape, etc. The present invention provides a compact, completely portable dictating machine using an identical belt record and having the operating convenience of a standard size dictating machine. Even so, this new machine is only about half the size of the machine described in the aforesaid patent, and it includes its own power supply in the form of self-contained batteries.

A portable dictating machine embodying features of the invention is constructed as follows. Mounted within a thin rectangular housing are a pair of small diameter mandrels upon which a belt record can be placed. The rear mandrel is positioned closely parallel to the rear side of the housing and is carried on a bracket which can be swung toward or away from the other mandrel. The rear portion of the housing is formed by a cover which is hinged along the lower rear edge of the machine. This cover is swung up to open the machine and to permit a belt record to be placed endwise upon the mandrels. The cover is linked to the bracket on which is carried the rear mandrel, and when the cover is lifted up, this mandrel is moved toward the forward one. In this position a belt record can easily be slipped over the mandrels. Thereafter, the cover is closed, and the rear mandrel moved back to tension the belt record between the two mandrels.

Now, when the cover closes, it releases an interlock thereby permitting a recording or a playback head in the machine to be actuated. These heads are carried on a carriage which moves along the front edge of the forward record mandrel. The carriage slides on a guide rod parallel to the mandrel and engages a feedscrew, also mounted parallel to this mandrel closely alongside it. The carriage in turn has a control lever which projects from the front of the housing of the machine and which selectively engages either of the heads or instead places both of them in neutral position. Alongside the control lever on the front of the carriage is a push-button by which the carriage can be secured in starting or "home" position. When the control lever is in neutral position and the carriage locked in home position by the push-button, a unique coupling mechanism conditions a latch on the side of the housing holding the cover closed so that it can be released and the cover opened. Thereafter, until a record is properly loaded on the mandrels and the cover again closed, the carriage is locked in home position, and neither the recording or the playback head can be put in operating position. After a record has been loaded on the mandrels and the cover again closed, the carriage control lever is conditioned so that either head can be put in operation. This automatically releases the push-button lock holding the carriage and permits it to be driven across the record by the feedscrew.

An important feature of this new machine is that the recording head is mounted so that it operates properly both when the machine is laid flat or when it is stood on end. This facilitates use of the machine in the field. Instead of bearing against an anvil, as is usual in a dual mandrel belt record machine, the recording stylus in this new machine bears directly against one mandrel. This permits a substantial saving of space. To prevent minute eccentricities in the record guiding action of the mandrels from interfering with the needed parallelism of the signal grooves being made in the record by the recording head, the circumference of the mandrel against which the recording head bears is made an integral sub-multiple of the length of the belt record. In this particular machine the length of the record is exactly three times the circumference of the mandrel.

A better understanding of the invention together with a fuller appreciation of its many advantages will best be gained from the following description given in connection with the accompanying drawings wherein:

FIGURE 2 is an enlarged plan perspective view of the machine with its cover open and with certain parts removed;

FIGURE 3 is a side, front perspective view of the machine;

FIGURE 4 is a further enlarged perspective view from the oposite side of the machine;

FIGURE 5 is an enlarged corner perspective view of the machine;

FIGURE 6 is a side view showing certain elements of the machine;

FIGURE 7 is an enlarged side view of the transducer head carriage and control lever;

FIGURE 8 is an enlarged view taken as indicated by lines 8—8 in FIGURE 5 showing the cover latch;

FIGURE 9 is a similar to FIGURE 8 but shows the latch and cover being opened; and FIGURE 10 is a top view taken as indicated by lines 10—10 in FIGURE 7.

Figure 1:
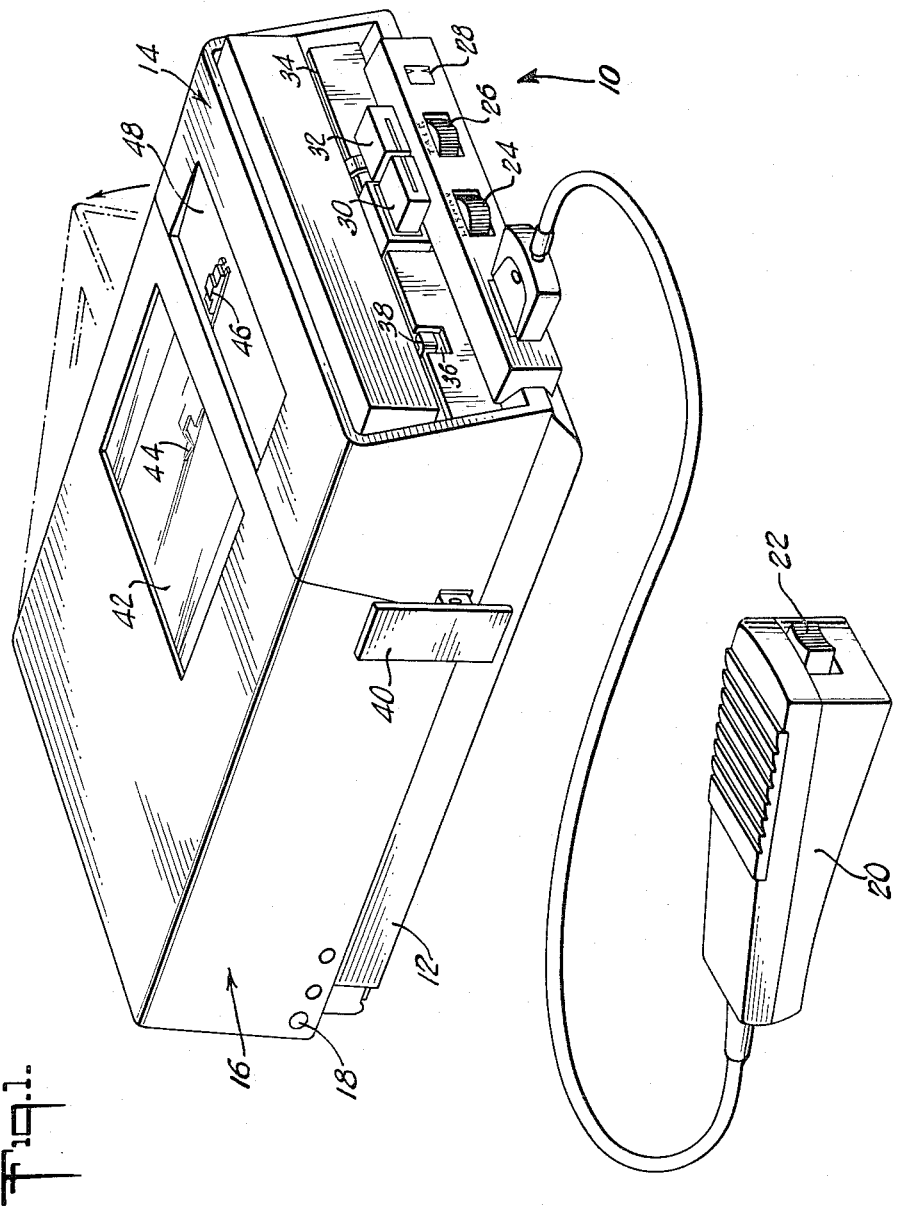
FIGURE 1 is a perspective view of a portable dictating machine embodying features of the invention.

The machine 10 seen in FIGURE 1 includes a base or frame 12 to which is fixed a front housing portion 14 and a cover 16, the latter being hinged to the base along its rear edge at 18. Plugged into the front of the machine is a hand microphone 20 which has a finger operated start-stop button 22 on its top. Pressing this button energizes a solenoid which in turn clutches a motor to the forward one of the two mandrels in the machine. This motor and the necessary electronic circuits are turned on by a finger operated rotary switch 24 on the front panel of the machine. This switch is part of a playback volume control. Alongside this on the panel is a recording volume control 26, and to the right of this is a recording volume-level meter 28. Above these are a push-button 30 and a control lever 32, both of which are mounted on a transducer head carriage (not seen here). Push-button 30 and lever 32 are fastened on portions of the carriage which extend through a long narrow slot 34 in the front of the machine. In the position shown in FIGURE 1, lever 32 is in neutral position, and the carriage is to the right of its home or starting position. The latter is the leftmost position of the carriage. When at home, push-button 30 stands opposite an opening 36 in the front panel. Projecting from inside of the machine into this opening is a tab 38 (see also FIGURE 3) of an interlock mechanism to be described in detail shortly. Thus, when push-button 30 is pushed in, interlock tab 38 will be moved inward thereby conditioning a finger-operated latch 40 on the outside of the machine so that the latch can be pulled out to release cover 16. When the latch is released the cover swings up, as indicated by the dotted lines, until, as seen in FIGURE 2, it is approximately at right angles to base 12. This opens the machine and allows a belt record to be loaded into it. In addition to permitting the release of latch 40, the pushing in of push-button 30 locks the carriage in home position. This is accomplished by the inner end of the push-button projecting into opening 36. Once pushed in, the push-button will so remain until automatically pushed out, as will be described shortly.

As seen in FIGURE 1, cover 16 has a window 42 through which a record in the machine can be seen. Also visible through this window is a pointer 44 which is mounted on the carriage and which indicates its position along the record. Projecting from the rear of the pointer and above the front part 14 of the housing is a correction and end-of-letter marker 46. This is manually operable to make a mark on a slip 48 to indicate the places where correction or end-of-letter points occur on the record.

FIGURE 2 shows the machine with its cover 16 fully open and with the front part 14 of the housing removed. The cover is hinged at 18 to base 12 by a two piece transverse pin 50 upon which is placed a coiled compression spring 52. This keeps the two parts of pin 50 in place. Cover 16 is stopped from swinging farther backward than the position shown by a stud 54 (see also FIGURE 3) on the inside of the cover which abuts a fixed shoulder 56 projecting upward from base 12.

Positioned closely in front of hinge pin 50 is a mandrel 60 which is rotatably mounted in end bearings in a swingable bracket, generally indicated at 62. This bracket and elements associated with it will be described in detail shortly. Mounted in end bearings carried by base 12 near the center thereof is a second mandrel 64 which is parallel to the first. Both mandrels are mounted in cantilever fashion so that, as seen in FIGURE 4, a belt record R can be slipped endwise onto them in the direction of arrow 66.

As was mentioned earlier, the length of record R is an integral multiple (e.g. 3) of the circumference of mandrel 64. In this machine the two mandrels 60 and 64 are of the same diameter (i.e. about one inch). The inner end of forward mandrel 64 has an upstanding flange 67 against which the inner edge of the record indexes. The outer ends of the mandrels, as seen in FIGURE 4, are covered by a rounded guide member 68 which is attached to the frame of the machine. This member, which is not shown in other figures of the drawings, covers certain elements to be described shortly. Also shown in FIGURE 4 but not in the other figures, is a shield plate 69 which covers certain mechanisms at the opposite end of the mandrels.

Immediately in front of forward mandrel 64 and movable parallel to it is a transducer head carriage, generally indicated at 70. This carriage slides along a fixed guide rod 72 and is selectively engageable with a feedscrew 74 in accordance with the position of control lever 32.

As seen best in FIGURES 2 and 3 there is mounted on base 12 next to rear mandrel 60 an electric motor 76. The shaft of this motor, through a belt 78, drives the rim of a clutch 80, the latter in turn being actuated by a solenoid 82. This solenoid is controlled by finger button 22 on the hand microphone of the machine. When the solenoid is energized, clutch 80 is engaged and its center hub 84 is driven in unison with the rim of the clutch. Looped around hub 84 is a second belt 86 which drives a pulley 88 fast on the end of forward mandrel 64. Driven in unison with pulley 88 (see FIGURE 2) is a gear 90 also carried on the end of mandrel 64. This gear meshes with a gear train, generally indicated at 92, through which feedscrew 74 is driven in reduced speed relation to mandrel 64.

When the cover of the machine is open, as seen in FIGURES 2, 3 and 6, rear mandrel is in its nearest position to forward mandrel 64, that is, the rear mandrel 60 has been swung forward. This permits a record to be placed on or taken off the mandrels. Now, as previously explained, in order for the cover to be opened carriage 70 must be in home position with lever 32 in neutral and with push-button 30 pushed in. It should be noted at this point that, for the sake of illustration, though the cover is open in FIGURES 2 and 3, the carriage is shown away from home position. The correct position for the carriage and the interlock mechanism associated with it when the cover is open, is shown in FIGURE 5. Carriage 70 is prevented from going farther to the left than shown here by an adjustable stop screw 94 carried on its left side (see also FIGURE 3).

The inner end of control lever 32 is fixed to a control shaft 96 journaled in carriage 70 closely in front of guide rod 72 (see also FIGURE 7). The left end of shaft 96, as seen in FIGURES 2, 3 and 5, projects beyond the left face of the carriage. As seen best in FIGURE 3, this left end has a pin 97 extending transversely through it, and the outer end of the shaft has an upstanding lug 98 integral with it. The angular relations of lever 32, pin 97 and lug 98 relative to shaft 96 are as shown.

With the carriage in home position, as shown in FIGURE 5, lug 98 of control shaft 96 is engaged by a slot 100 in the forward end of a finger 102 (see also FIGURE 6). This finger is pivoted to the frame at 104 and is spring-urged into the position shown. The finger thus holds control lever 32 in neutral position and insures that neither the recording nor the playback head can be shifted into operating position so long as the cover is open. When the cover is closed, it presses down the rear end of finger 102 (see FIGURE 4) thereby raising its slotted end 100 and disengaging it from lug 98. Assuming that a record had been properly placed on the mandrels before the cover was closed, control lever 32 of the carriage can now be shifted up or down either into playback or record position. Doing this automatically releases push-button 30 and unlocks the carriage so that it can be driven across the record by the feedscrew. This is accomplished as follows.

As seen best in FIGURES 3, 4 and 5, interlock tab 38, which is engaged by the inner end of push-button 30 when locked in home position, is the outer end of an L-shaped arm 106. This arm is pivoted on a vertical post 108. The forward portion of arm 106 has two offset prongs 110 and 111. When carriage 70 is in home position as seen in FIGURE 5, and with interlock tab 38 pushed inward by push button 30, prongs 110 and 111 abut, respectively, the upper and lower ends of pin 97. Thus by rotating shaft 96 through the agency of control lever 32, in either direction, one prong or the other will be pushed forward by pin 97. This causes push-button 30 to snap out of engagement with opening 36 and unlocks the carriage.

The rear portion of arm 106, as seen in FIGURES 3, 5 and 6, lies behind and engages the forward end of a leaf-spring arm 114. The front end of this arm is guided by a pin 115 fixed to the frame, and the rear end of the arm is attached to the frame at 116. Now, when interlock tab 38 of arm 106 is forced inward by push-button 30, the rear end of this arm will swing outward thereby moving spring arm 114 toward finger latch 40. As seen in FIGURE 9, this outward movement of arms 106 and 114 moves the latter to the solid line position shown and conditions latch 40 to permit the opening of the cover. Latch 40 is pivoted to the frame at 118, being urged by a spring in the clockwise direction. The latch has a lug 120 to the right of its pivot 118. The inner face of the latch has a shoulder 122 which engages a catch or tab 124 on the front lower edge of cover 16 (see also FIGURE 2). When spring arm 114 occupies the solid line position shown in FIGURE 8, lug 120 cannot swing counterclockwise upward and hence latch 40 cannot be released.

Rear mandrel 60 is journaled in a bracket 62 which, as seen in FIGURES 3 and 6, is pivoted to the frame at 126. The bracket is spring-urged counter-clockwise about this pivot away from the position shown here. Attached by screws 128 to the end of the bracket is a plate 130 which (see FIGURES 2 and 6) carries a pin 132. The latter projects through a hole 134 in another plate 136. This upper end of plate 136 is pivoted at 138 to a post 140 fastened to base 12. Connected to pivoted plate 136 near its center at a pivot point 142 is a rearwardly extending link 144. The rear end of this arm is slotted and engages a pin 146 projecting from the end of a short arm 148. This arm is fastened by rivets 149 to the inside wall of cover 16. Now, when cover 16 is swung forward to close it, pin 146 swings down and back thereby permitting mandrel bracket 62 to swing counter-clockwise about its pivot 126. This moves mandrel 60 away from mandrel 64 and tensions a belt record between them.

With the backward swinging of bracket 62, the lower end of pivoted plate 136, as seen in FIGURE 6, swings forward. Pivoted to this lower end at point 150 is a long link 152. The front end of the latter is pivoted at 154 to a crank arm 156. This arm in turn is pivoted to the frame at point 104, which is also the pivot for finger 102. Similarly, the forward end of crank arm 156 is slotted at 158. When no record has been placed on the mandrels and cover 16 is swung closed, crank arm 156 moves clockwise about pivot 104, and its slot 158 moves down to engage lug 98. Thus even though finger 102 will now be disengaged from the lug, it will instead be held in slot 158 and the carriage control lever cannot be shifted out of neutral. On the other hand, when a record is on the mandrels, crank-arm 156 does not swing down enough for its slot 158 to engage lug 98 when the cover is closed because the record limits the rearm and movement of rear mandrel 60.

FIGURES 2 and 3 show carriage control lever 32 in reproduce or playback position, whereas FIGURE 4 shows it in record position, and FIGURES 5 and 7 show it in neutral position. As seen best in FIGURE 7, control shaft 96 has fixed to it an upstanding lever 160, the top of which carries a transverse cam pin 162. When lever 32 is shifted up to playback position, as indicated by the dotted lines in FIGURE 7, and as shown in FIGURE 3, pin 162 rocks forward on a cam arm 164. The latter is fixed to a block 166 pivoted to the carriage at 168. Projecting forward from block 166 and adapted to engage a record is a playback head 170. This head is spring-urged into engagement with the record by a spring 172, but is lifted out of engagement by the action of pin 162 when control lever 32 is placed in neutral or in record position.

Pivoted to upstanding lever 160 on a common axis with pin 162 is a cam plate 174. The forward end of this plate has a slot 175 cut through it into which a guide pin 176 (see also FIGURE 9) fixed to carriage 70 projects. On the upper edge of plate 174 near its forward end is a cam surface 178 upon which rides a transverse pin 180 (see also FIGURE 10). This pin projects from a bracket 182 which is pivoted to the carriage at 184. The bracket is spring-urged counter-clockwise about pivot 184, as seen in FIGURE 7, by a spring 186. Mounted on the bracket is a recording head 188 which is adapted to swing forward into the dotted line position shown in FIGURE 7 when control lever 32 is shifted down into record position as seen in FIGURE 4.

Recording head 188 is pivoted to carriage 70 and spring 186 is positioned so that the recording stylus bears against the record with the same force when the machine is horizontal as when it is standing on end. This permits the machine to operate properly in almost any position.

The bottom edge of cam plate 174 has a groove 190 which in the position shown in FIGURE 7, mates with the curved end of a spring finger 192. When the cam plate is shifted either forward or backward from the position shown, spring finger 192 will be depressed. This engages a plunger 194 to couple a clutch-nut with feedscrew 74 thereby connecting carriage 70 in driving relation with the feedscrew.

In FIGURE 7 there is seen projecting downward from control shaft 96 a forked arm 196. The lower end of this arm is slotted and slidably engages a horizontal rod 198 (see also FIGURES 2 and 4). This rod extends beneath carriage 70 for the length of its travel. Rod 198 is fixed between two L-shaped end brackets 200 which are pivoted to base 12 on an axis 202. Fixed between the other ends of these brackets 200 closely above base 12 is a similar rod 204. The latter engages the ends of a number of leaf-spring switches 206 mounted on base 12 and by means of which the electric circuits in the machine are switched to and from recording and playback conditions. These electric circuits are mounted on an insulating sheet 208 fastened against base 12. Certain of the circuit elements, not identified by reference numbers, may be seen in FIGURES 2, 3 and 4.

Machine 10 is powered by self-contained rechargeable batteries. One battery is inside mandrel 60 and the other, inside mandrel 64. Electrical connections to the batteries are provided at the ends of the mandrels in the following way. As seen in FIGURE 3 an insulated conductor pin 210 passing through the end bearing of the mandrel makes connection to this end of the battery within the mandrel. The outer end of pin 210 in turn is contacted by one end of a spring connector 212 whose other end is held in an insulator block 214 carried by bracket 62. Similarly, the battery within mandrel 64 is contacted by an insulated pin 216 against which bears a spring connector 218. The other end of this connector is fixed in an insulator block 220 attached to base 12. Electrical connections to the other ends of the batteries, as seen in FIGURE 2, are made respectively, by insulated pins 222 and 224 and by spring connectors 226 and 228. Normally, these end connections are covered, as shown in FIGURE 4, by guide member 68 and by cover plate 69.

The drawings herein were made from an actual machine and show its various parts substantially to scale.

The above description of the invention is intended in illustration and not in limitation. Various changes in the embodiment illustrated may occur to those skilled in the art, and these can be made without departing from the spirit or scope of the invention as set forth.

We claim:

1. In a belt record recording machine, drive means including at least one small diameter mandrel rotatably mounted on a frame and adapted to support a belt record, a recording head having a stylus adapted to form a signal groove in the record, and means to scan said head across said record to cut closely adjacent signal tracks therein, the circumference of said mandrel being an integral submultiple of the length of said belt record whereby the closely adjacent signal tracks are properly recorded in spite of minor eccentricities in the record guiding action of the mandrel.

2. The combination in claim 1 wherein said drive means includes a first and a second mandrel spaced parallel to each other and between which a belt record is adapted to be stretched taut, said stylus being positioned to bear against said record where it is upon one of said mandrels.

3. The combination in claim 1 wherein said recording head is pivoted closely adjacent said one mandrel and is counterbalanced so that in operative position said head bears against the record with substantially the same force when the machine is either horizontal or vertical.

4. A portable belt record dictating machine comprising a frame, a pair of mandrels mounted on said frame and adapted to support a belt record, means to drive one of said mandrels, a transducer head having a recording stylus, a carriage positioned closely adjacent one of said mandrels and adapted to scan said head across the record, said head being pivoted on said carriage closely adjacent said one mandrel and being counterbalanced by a spring so that in operative position said head bears against said record with substantially equal force when said machine is horizontal and when it is upright.

5. A portable dictating machine of the character described comprising: a frame, a housing cover hinged to said frame, mandrel means mounted in cantelever fashion on said frame and adapted to support a belt record, linkage means connecting said cover with said mandrel means to tension a belt record mounted thereupon when said cover is closed, a carriage mounted closely adjacent said mandrel means, and slidable therealong, a transducer head mounted on said carriage and adapted to engage a record, means to drive said carriage and said mandrel means, operating means including a manual control lever to selectively engage said head with said record and said carriage with said drive means, and an interlock mechanism interconnecting said operating means and said linkage, and mandrel means to lock said carriage in a home position when said cover is open and when no record is on said mandrel means, and to lock said cover closed when said carriage is not at home position.

6. The machine in claim 5 wherein said interlock means includes a manual push button on said carriage, a control shaft on said carriage and to which is fixed said control lever, a pair of slotted fingers pivoted to said frame, and a lever pivoted to said frame, said lever interconnecting said push button and said shaft, said fingers being engageable with said shaft to prevent said head from being engaged with a record, one of said fingers engaging said shaft when said cover is opened, the other of said fingers engaging said shaft when said cover is closed and no record is on said mandrel means.

7. In a dictating machine of the character described, means to support and drive a belt record in a flat taut loop, a carriage carrying at least one transducer head and adapted to scan the record, a manually operable control lever extending from said carriage, said lever being shiftable into recording, playback and neutral positions, a manually operable button on said carriage alongside said lever, said button being adapted to lock said carriage in a home position, and means interconnecting said button with said lever to unlock said button when said carriage is shifted out of neutral position.

8. The arrangement in claim 7 in further combination with a manually operable latch, said interconnecting means locking said latch until said button locks said carriage in home position.

9. In a dictating machine of the character described, mandrel means for supporting and driving a belt record, a transducer head carriage slidable parallel to said mandrel means to traverse a head across a belt record mounted on said mandrel means, a control lever connected to said carriage to shift it from neutral into operating condition and vice versa, switch means mounted adjacent said carriage, a rod for operating said switch means when said carriage is shifted into operating condition, and a slidable connection between said carriage and said rod.

10. The mechanism in claim 9 wherein said control lever is mounted on a control shaft journalled in said carriage parallel to said rod, and a forked lever extending from said shaft to said rod.

11. In a dictating machine wherein a belt record is stretched between a pair of mandrels, one of which serves as a recording head anvil, a mandrel having a guide flange and a circumference which is an integral sub-multiple of the length of the belt record, a recording head having a stylus adapted to press against said mandrel with a record therebetween to put closely adjacent signal tracks in the record, whereby the closely adjacent signal tracks are properly recorded in spite of minor eccentricities in the record guiding action of the mandrel.

12. In a dictating machine of the character described, a frame, a cover hinged to said frame, a pair of mandrels mounted in cantilever fashion on said frame, one of said mandrels being linked to said cover and movable away from the other when the cover is closed, a transducer head and carriage adapted to scan a record on said mandrels, a control member for shifting said head from nutral into playing condition and vice versa, and interlock means to prevent said cover from being opened when said head is in playing condition and to prevent said head from being shifted into playing condition when said cover is open.

13. The arrangement in claim 12 wherein said carriage includes a control shaft journalled in it parallel to said mandrels, one end of said shaft projecting beyond said carriage and having a lug, a pair of latch fingers pivoted to said frame, each finger having a slotted end engageable with said lug, one finger being spring urged into engagement with said lug and being disengaged by said cover when it is closed, the other finger being linked to said one mandrel and engageable with said lug when said cover is closed and no record is on said mandrels.

14. The arrangement in claim 13 wherein said shaft carries a two-ended pin, a push-button locking pin on said carriage, said frame having an opening into which said pin can project, a pivoted arm having a tab behind said opening and adapted to be pushed inward by said pin, a latch for opening said cover, and lock means controlled by said pivoted arm for preventing release of said cover latch when said pin is not engaging said tab.

15. The arrangement in claim 14 wherein said pivoted arm has two prongs, each engageable with a respective end of said two-ended pin, whereby rotation of said shaft in either direction automatically pushes said locking pin out of said opening.

References Cited by the Examiner

UNITED STATES PATENTS

| | | | |
|---|---|---|---|
| 2,654,609 | 10/1953 | Shepherd | 274—11 |
| 2,899,506 | 8/1959 | Wehmer | 274—11 X |
| 2,948,374 | 8/1960 | Husband | 74—217 |
| 2,951,127 | 8/1960 | Pierson et al. | 274—17 |
| 2,990,184 | 6/1961 | Stanton | 274—11 |
| 3,018,111 | 1/1962 | Balmer et al. | 274—9 |
| 3,056,606 | 10/1962 | Schueler et al. | 274—17 |

LOUIS J. CAPOZI, *Primary Examiner.*

R. R. KINSEY, *Examiner.*